A. H. MAÎTRE & V. H. G. MARTIN.
CONTACT BREAKER DEVICE FOR ELECTROMAGNETIC VIBRATING MEMBERS.
APPLICATION FILED FEB. 18, 1914.

1,188,295.

Patented June 20, 1916.
4 SHEETS—SHEET 1.

WITNESSES
L. H. Grote
M. E. Keis

INVENTORS
Alcide Hector Maître
Victor Henri Gaston Martin
BY
Howson and Howson
ATTORNEYS

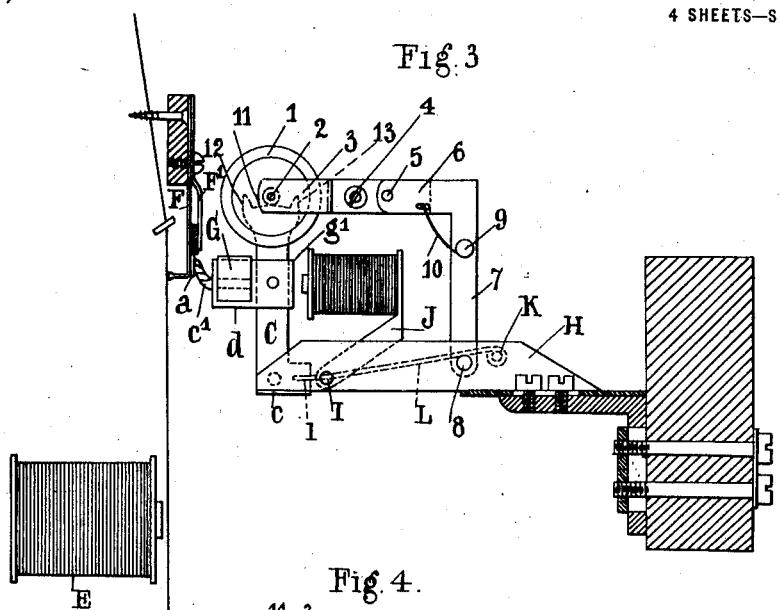
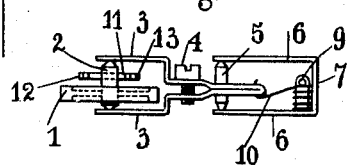
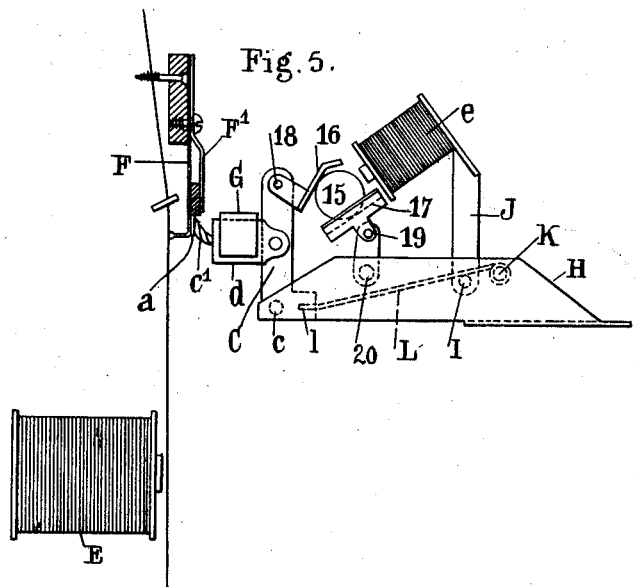

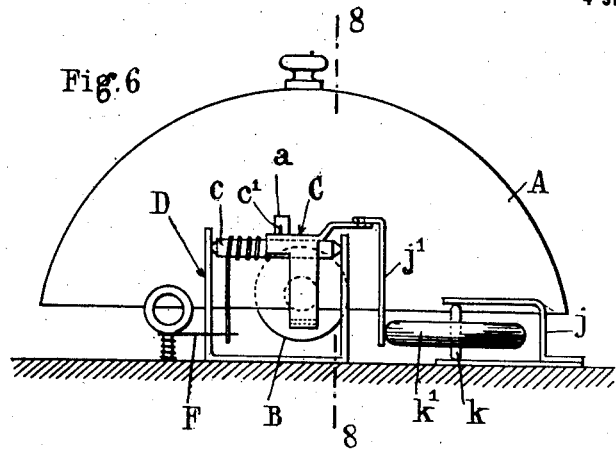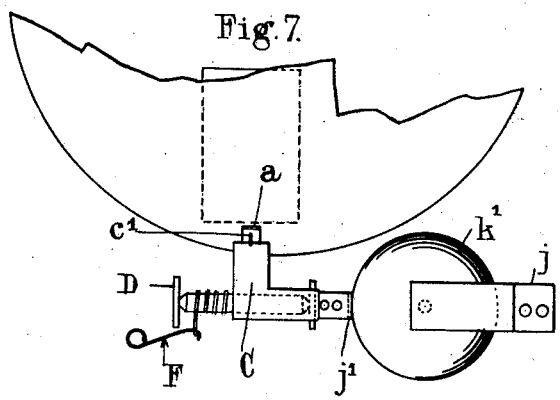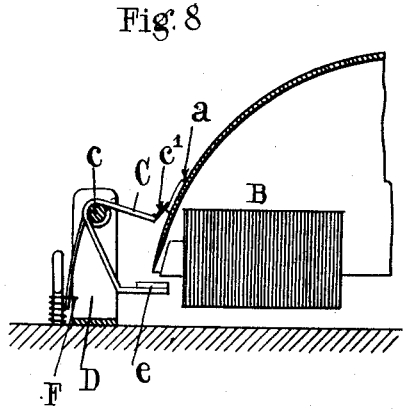

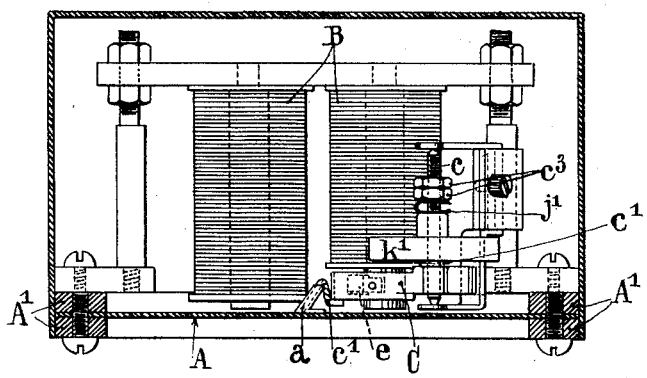
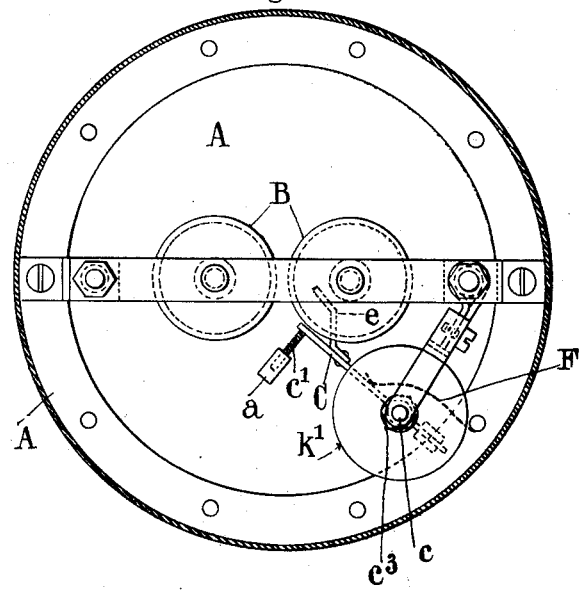

UNITED STATES PATENT OFFICE.

ALCIDE HECTOR MAÎTRE AND VICTOR HENRI GASTON MARTIN, OF ROUEN, FRANCE.

CONTACT-BREAKER DEVICE FOR ELECTROMAGNETIC VIBRATING MEMBERS.

1,188,295. Specification of Letters Patent. Patented June 20, 1916.

Application filed February 18, 1914. Serial No. 819,602.

*To all whom it may concern:*

Be it known that we, ALCIDE HECTOR MAÎTRE and VICTOR HENRI GASTON MARTIN, both citizens of the Republic of France and both residing at 42 Rue Damiette, Rouen, France, have invented a new and useful Contact-Breaker Device for Electromagnetic Vibrating Members, of which the following is a specification.

The present invention relates to contact-breaker devices for electromagnetic vibrating members, and more particularly to the devices described in German Patent No. 229,964, dated August 10th, 1909, and U. S. Patent 1,106,230, dated Aug. 4, 1914. As is known these devices are characterized especially by the fact that the contact piece intended to close the electrical circuit by its contact with the vibrating body (gong, plate, string, etc.) is carried by a movable arm mounted upon a pivot and capable of making oscillations of small amplitude.

Experiments have shown that in order to obtain a pure note and in order that this note may be attained rapidly, it is advantageous, especially in the case of setting piano-strings in vibration, to reduce to the greatest extent possible the amplitude of the oscillations of the movable contact piece.

The present invention consists of a device which is adapted to produce this result, its principle being to brake or damp the oscillations of the movable contact piece.

The annexed drawing shows by way of example various forms of construction of the object of the invention.

Figure 1:
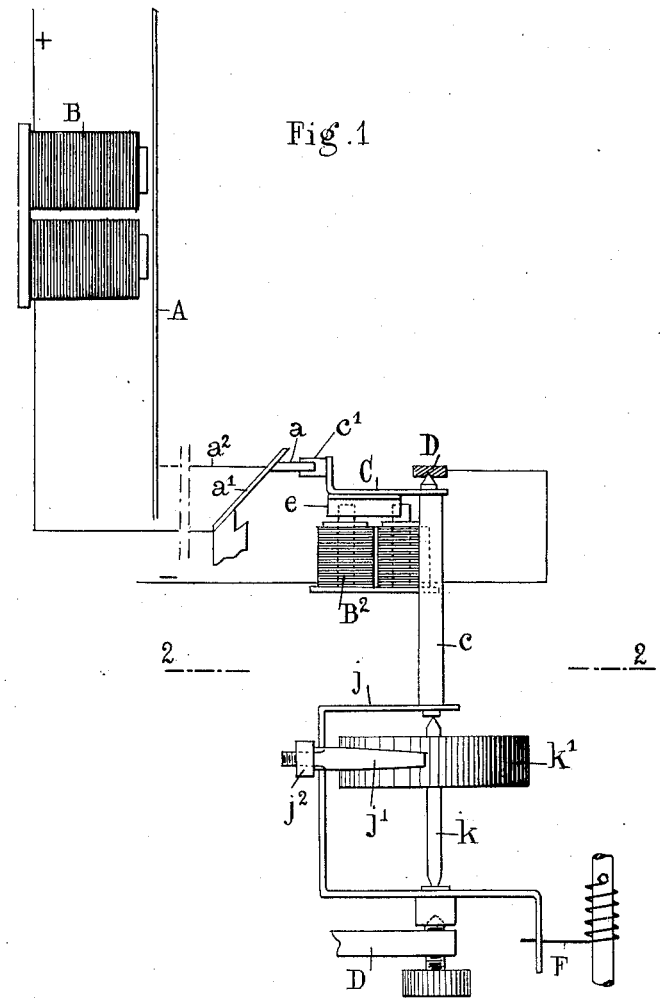
Figure 2:
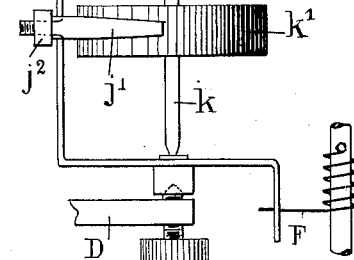

Figures 1 to 5 show forms of construction applied to devices for setting in vibration the wires or strings of a pianoforte. Fig. 1 is an elevation of a first form of construction. Fig. 2 is a section on line 2—2 of Fig. 1, seen from above. Fig. 3 is an elevation of a second form of construction. Fig. 4 is a part view in plan, corresponding to Fig. 3. Fig. 5 is an elevation of a third form of construction. Figs. 6 to 8 show a form of construction applied to a device for vibrating a steel gong. Fig. 6 is a view of the device in elevation. Fig. 7 is a plan corresponding to Fig. 6. Fig. 8 is a part section on line 8—8 of Fig. 6, seen from the right. Figs. 9 and 10 show a form of execution applied to the actuation of a vibrating plate. Fig. 9 is an elevation of the device. Fig. 10 is a plan corresponding to Fig. 9.

In the form of construction of Figs. 1 and 2, the contact piece $a$, instead of being mounted directly upon the piano string A, (as described in said U. S. Patent 1,106,230) is carried by a vibrating rod $a^1$ connected to the string A by a wire or by a rigid member $a^2$ which serves to transmit to the part $a$ the vibrations of the string A. C is an oscillating plate mounted on an axle $c$ and carrying the contact piece $c^1$. The axle $c$ is continued downward by a stirrup $j$, the whole being journaled on cone-centers in a fixed support D. A spring F tends constantly to revolve the unit formed by the axle $c$ and stirrup $j$ and therefore also the plate C, in such a manner as to bring the contact piece $c^1$ against the contact piece $a$. The plate C is integral with an armature $e$ placed under the influence of two electromagnets $B^2$.

In the example shown the electromagnets $B^2$ are supposed to be mounted in series in the excitation circuit of the main electromagnets B which exert their attraction upon the string A. Consequently the attraction of the armature $e$ by the electromagnets $B^2$ and the rupture of the circuit at the contact $c^1$ $a$ will take place in synchronism with the variations of the exciting current of the principal electromagnets B.

Between the two arms of the stirrup $j$ there is pivoted by means of two cone-centers a spindle $k$ upon which is keyed a heavy flywheel $k^1$. A flexible plate $j^1$ carried by the stirrup $j$ bears upon the periphery of the flywheel $k^1$, and a screw $j^2$ allows of adjusting the pressure which the plate $j^1$ exerts upon the surface of the flywheel $k^1$.

The working of the device is as follows:—When the plate C oscillates under the influence of the electromagnets $B^2$ and the spring F, it rotates the axle $c$, the stirrup $j$ and the flexible plate $j^1$. By reason of the friction exerted by the plate $j^1$ upon the flywheel $k^1$, the plate $j^1$ then tends to carry the flywheel $k^1$ with it; but owing to its inertia, the flywheel opposes a resistance to the force tending to set it in rotation. Consequently the oscillation of the plate C is braked without being absolutely prevented. The same result takes place for each direction of oscillation of the plate C, and the flywheel $k^1$ thus acts as a veritable damping device.

In the arrangement of Figs. 3 and 4, the contact piece $a$ is placed near the piano-string A. E is the electromagnet which vibrates the string A, while F is a spring carrying a non-oxidizing contact $a$ and pressing at its curved end upon the string A so as to make the contact $a$ move with the string, $F^1$ is an opposing spring pressing against the spring F through a pad of soft material such as a piece of felt. $c^1$ is a non-oxidizing contact formed preferably of a bundle of fine wires conveniently twisted and fitted in a soft material such as rubber itself gripped between the two arms $d$ of a fork or pincer device mounted upon the movable arm C; a small piece of sheet metal bent to U shape holds together the arms $d$ of the pincer. One end of the flexible wire $c^1$ bears upon the contact piece $a$; the other end of the wire $c^1$ is folded between the rubber and one of the arms $d$ of the fork or pincer so as to establish the electrical connection of $c$ with the movable arm C and therefore with the forked copper support H, between the arms of which the shaft $c$ is pivoted. Upon one of the cheeks of this support, there is pivoted at I, with tightly pressed friction washers, the arm J which carries the electromagnet $e$, in such a way that by pulling or pushing this electromagnet it is possible to regulate the force of attraction which it exerts upon the armature $g^1$. As in the previous example, the electromagnet $e$ is supposed to be connected in series in the exciting circuit of the main electromagnets E which exert their attraction upon the string A. K is a distance-piece of which the extremities are riveted tightly with friction washers upon the cheeks of the support H. A spring L, wound around the distance piece K and fixed thereto at one of its ends, has its other end engaged in the slot $l$ of the movable arm C, in such a way that by revolving the distance piece on its axis the tension of the spring L and the pressure at the contacts $c^1$ $a$ can be varied.

The flywheel 1 is keyed upon a shaft 2 journaled in the arms of a fork 3, the pressure between the arms being adjustable by means of a screw 4 which may be provided with a lock-nut. The flywheel 1 and its shaft 2 are preferably in one piece so as to be perfectly centered and made of copper so that the friction of the cones may take place copper upon copper, without play and with great freedom; but it is evident that the shaft 2 might be supported upon two trunnions turning in two holes lined with a non-metallic substance such as horn in order to avoid noise. The fork 3 is itself pivoted by means of a spindle 5 in a second fork or pincer device 6 made of brass, one arm 7 of which is riveted at 8 to the support H. The riveting is done tightly with washers to cause friction so that the flywheel can be advanced or drawn back, but remains in place when once set. The pin 9, tightly riveted in the arm 7, carries a spring 10 and allows of adjusting the pressure of the flywheel 1 upon the movable arm C. The upper end of the movable arm C terminates in a circular arc 11, the center of which is at the axle $c$ of the movable arm C. The flywheel presses its shaft 2 upon this arc at a point in the vertical line passing through $c$, so as not to alter the pressure of the contacts $c^1$ $a$. When the movable arm is drawn along slowly, for example by the return spring L, the flywheel 1 rolls upon the circular arc 11; but if the movement of the movable arm is rapid, the rolling cannot take place, and the shaft 2 then slips upon the arc 11, which produces a damping effect. It is evident that the weight of the flywheel 1, the relation of its diameter to that of the shaft 2, and the tension of the counter-pressure spring 10 must be suitably regulated, the damping having to be more powerful when the notes are of deeper tone. Two stops or shoulders 12 and 13 prevent the flywheel from becoming disengaged from the arm and limit the stroke of the latter.

It is evident that the position of the flywheel is given merely by way of example and that it may equally well be made to act beneath or behind the movable arm C; it is also evident that the position of the axle $c$ at the center of the arc is not absolutely necessary and that $c$ can be placed eccentric so that the pressure of the flywheel contributes to modify the pressure of the contacts $c^1$ $a$. There may be arranged behind the spindle 5 a transverse rod pressing by means of a spring upon the fork 3, in such a way as to vary at will or even to withhold the pressure of the flywheel 1 upon the movable arm C so as to give the latter all liberty of movement necessary to the tones which it is desired to obtain.

Fig. 5 represents a form of construction applicable like the preceding one, to the setting in vibration of a piano string A when the contact piece $a$ is close to the string. This form of construction is characterized by the fact that the braking takes plate under variable pressure and with wedging. The same letters of reference designate the same parts as in Figs. 3 and 4.

The amortiser or damping device consists of a loose ball 15 placed between a pallet 16 and an inclined trough 17. The pallet 16 is hinged with much friction at 18 upon the movable arm C; the trough 17 is provided with a double friction-held joint 19, 20. The hinges 18, 19 and 20 allow of regulating the relative position of the pallet 16 and trough 17.

When at rest, the ball 14 wedges by its weight the movable arm C. When the current starts, the electromagnet *e* attracts the ball 15; the movable arm C becoming free is brought back by the spring L and the contact $c^1$ *a* is broken. Immediately the electromagnet releases the ball 15 which restores the contact $c^1$ *a;* the same actions are repeated successively and the movable arm C takes up a movement of rapid oscillation. Nevertheless, owing to the wedging action of the ball 15, the amplitude of the oscillatory movement is very greatly reduced.

It is evident that in this device the electromagnet *e* can be arranged to act both upon the movable arm C and upon the ball 15.

Figs. 6, 7 and 8 show a form of construction of the invention applied to the setting in vibration of a steel gong. The same letters of reference designate the same parts as in Figs. 1 and 2. The electromagnet B by the attraction of its armature *e* effects simultaneously the setting in vibration of the gong A and the breaking of the contact at $c^1$ *a*.

The stirrup *j* in which is pivoted the shaft *k* of the flywheel $k^1$ is independent of the pivot *c* and mounted in such a way that the shaft *k* may be perpendicular to the pivot *c*. Moreover, the shaft *k* might have been arranged parallel to the pivot *c* by making the plate $j^1$ bear upon one of the extreme faces or bases of the flywheel $k^1$; the shafts *k* and *c* might also have been placed in any two concurring directions, because it is always possible to find a plane perpendicular to the shaft *c* and tangential to the flywheel $k^1$.

Figs. 9 and 10 show a form of construction applied to the setting in vibration of parts easy to stimulate as for example a vibrating plate. The same letters of reference designate the same parts as in Figs. 1 and 2. The vibrating plate A, forcibly gripped between two metal rings $A^1$ carries riveted thereon a non-oxidizing contact piece *a* upon which there bears a second non-oxidizing contact-pieces $c^1$ integral with the movable arm C.

The flywheel $k^1$, mounted upon the shaft *c* is held between the shoulder $c^2$ of the shaft *c* and the spring $j^1$; a double nut $c^2$ allows of regulating the friction of the flywheel $k^1$ upon the collar $c^2$ and spring $j^1$ so as to obtain the extent of damping desired.

It is moreover quite evident that the invention is not limited to the forms of construction that have been described, and that it can be carried out under all modifications based upon the same principle. Thus for example the braking may be obtained by means of several flywheels for each contact, these acting separately upon the movable arm C or acting successively one upon another.

On the other hand the braking device of the present invention may be applied to all systems of interrupters or contact-breakers, whatever be the mode of suspension of the moving arm (pivot, spring, etc.), whatever be the method of control of the breaking of the contact (electromagnets, heated resistances, etc.), and whatever be the object of the oscillation of the contact-breaker (setting in vibration of sonorous devices, transmission of a current synchronous with the vibration of a diaphragm, etc.) Lastly it may be applied equally in the case where the movable arm is not subjected to any direct control of the closing or breaking of the contact and acts merely by its own inertia.

What we claim and desire to secure by Letters Patent of the United States is:

1. In an electric circuit, an electro-magnetically vibrated member, a contact vibrating in unison therewith, a second vibratory contact coöperating with the first mentioned contact to complete the operating electro-magnetic circuit and means to damp the vibrations of said second contact.

2. In an electric circuit, an electro-magnetically vibrated member, a contact vibrating in unison therewith, a second vibratory contact coöperating with the first mentioned contact to complete the operating electro-magnetic circuit and brake means to damp the vibrations of said second contact.

3. In an electric circuit, an electro-magnetically vibrated member, a contact vibrating in unison therewith, a second vibratory contact coöperating with the first mentioned contact to complete the operating electro-magnetic circuit and inertia brake means to damp the vibrations of said second contact.

4. In an electric circuit, an electro-magnetically vibrated member, a contact vibrating in unison therewith, a second vibratory contact coöperating with the first mentioned contact to complete the operating electro-magnetic circuit and rotary brake means to damp the vibrations of said second contact.

5. In an electric circuit, an electro-magnetically vibrated member, a contact vibrating in unison therewith, a second vibratory contact coöperating with the first mentioned contact to complete the operating electro-magnetic circuit and rotary inertia brake means to damp the vibrations of said second contact.

6. In an electric circuit, an electro-magnetically vibrated member, a contact vibrating in unison therewith, a second vibratory contact coöperating with the first mentioned contact to complete the operating electro-magnetic circuit and adjustable brake means to damp the vibrations of said second contact.

7. In an electric circuit, an electro-magnetically vibrated member, a contact vibrating in unison therewith, a second vibratory contact coöperating with the first mentioned contact to complete the operating electro-magnetic circuit, a rocker arm carrying said second contact and brake means operating on said rocker arm to damp the vibrations of the contact carried thereby.

8. In an electric circuit, an electro-magnetically vibrated member, a contact vibrating in unison therewith, a second vibratory contact coöperating with the first mentioned contact to complete the operating electro-magnetic circuit, electro-magnetic means in the operating circuit for vibrating said second contact and means to damp the vibrations of the latter.

9. In an electric circuit, an electro-magnetically vibrated member, a contact vibrating in unison therewith, a second vibratory contact coöperating with the first mentioned contact to complete the operating electro-magnetic circuit, a rocker arm carrying said second contact, electro-magnetic means in the operating circuit for vibrating said arm and brake means operating on said rocker arm to damp the vibrations of the contact carried thereby.

10. In an electric circuit, an electro-magnetically vibrated member, a contact vibrating in unison therewith, a second vibratory contact coöperating with the first mentioned contact to complete the operating electro-magnetic circuit, a rocker arm carrying said second contact, electro-magnetic means in the operating circuit for vibrating said arm and rotary brake means operating on said rocker arm to damp the vibrations of the contact carried thereby.

11. In an electric circuit, an electro-magnetically vibrated member, a contact vibrating in unison therewith, a second vibratory contact coöperating with the first mentioned contact to complete the operating electro-magnetic circuit, a rocker arm carrying said second contact, electro-magnetic means in the operating circuit for vibrating said arm and adjustable brake means operating on said rocker arm to damp the vibrations of the contact carried thereby.

12. In an electric circuit, an electro-magnetically vibrated member, a contact vibrating in unison therewith, a second vibratory contact coöperating with the first mentioned contact to complete the operating electro-magnetic circuit, a rocker arm carrying said second contact, electro-magnetic means in the operating circuit for vibrating said arm and adjustable rotary brake means operating on said rocker arm to damp the vibrations of the contact carried thereby.

13. In an electric circuit, an electro-magnetically vibrated member, a contact vibrating in unison therewith, a second vibratory contact coöperating with the first mentioned contact to complete the operating electro-magnetic circuit, a rocker arm carrying said second contact, electro-magnetic means in the operating circuit for vibrating said arm and brake means operating on said rocker arm to damp the vibrations of the contact carried thereby, together with spring means governing the action of said brake.

In testimony whereof we have signed our names to this specification in the presence of the four subscribing witnesses.

ALCIDE HECTOR MAÎTRE.
VICTOR HENRI GASTON MARTIN.

Witnesses:
 FERNAND LINAULT,
 LOUIS COROUDE,
 EUGINE LEGIES,
 LUCIEN MENNUNGRE.